(12) United States Patent
Heider et al.

(10) Patent No.: US 6,727,020 B2
(45) Date of Patent: Apr. 27, 2004

(54) REDUCED POSITIVE-ELECTRODE MATERIAL IN AN ELECTROCHEMICAL CELL

(75) Inventors: Lilia Heider, Riedstadt (DE); Natascha Lotz, Erzhausen (DE); Tanja Sandner, Russelsheim (DE); Mathias Rothenburger, Mainz (DE); Anja Amann, Brensbach (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 201 days.

(21) Appl. No.: 09/864,092

(22) Filed: May 24, 2001

(65) Prior Publication Data

US 2002/0028381 A1 Mar. 7, 2002

(30) Foreign Application Priority Data

May 25, 2000 (DE) .......................................... 100 25 762

(51) Int. Cl.$^7$ ................................................. H01M 4/58
(52) U.S. Cl. ................. 429/218.1; 429/232; 252/182.1; 423/618
(58) Field of Search .............................. 429/218.1, 232; 252/182.1; 423/618

(56) References Cited

U.S. PATENT DOCUMENTS 6,316,143 B1 * 11/2001 Foster et al. ............. 429/218.1

FOREIGN PATENT DOCUMENTS

EP 0 867 955 A1 * 9/1998

* cited by examiner

*Primary Examiner*—Laura Weiner
(74) *Attorney, Agent, or Firm*—Millen, White, Zelano & Branigan, P.C.

(57) ABSTRACT

The invention relates to a modified oxidic material, such as, for example, a tin oxide, as active positive-electrode material in, for example, an electrochemical cell.

14 Claims, No Drawings

REDUCED POSITIVE-ELECTRODE MATERIAL IN AN ELECTROCHEMICAL CELL

The invention relates to novel materials based on modified oxidic materials, such as, for example, tin oxides, as active positive-electrode material in electrochemical cells.

Lithium ion batteries are amongst the most promising systems for mobile applications. The areas of application extend from high-quality electronic equipment (for example mobile telephones, camcorders) to batteries for electrically driven motor vehicles.

These batteries may include a negative electrode, a positive electrode, a separator and a non-aqueous electrolyte. The negative electrode is typically $Li(MnMe_z)_2O_4$, $Li(CoMe_z)O_2$, $Li(CoNi_xMe_z)O_2$ or other lithium intercalation and insertion compounds. Positive electrodes can consist of lithium metal, soft and hard carbons, graphite, graphitic carbons or other lithium intercalation and insertion compounds or alloy compounds. As electrolyte, use is made of solutions containing lithium salts, such as $LiPF_6$, $LiBF_4$, $LiClO_4$, $LiAsF_6$, $LiCF_3SO_3$, $LiN(CF_3SO_2)_2$ or $LiC(CF_3SO_2)_3$ and mixtures thereof in aprotic solvents.

In the lithium ion batteries currently commercially available, carbon is employed as positive electrode. However, this positive-electrode system has some problems. A considerable drop in capacity occurs in this system during the 1st cycle due to irreversible incorporation of lithium into the carbon structure. In addition, the cycle stability of the carbons and graphites available is unsatisfactory. Furthermore, there is the safety aspect that kinetic limitations can cause critical parameters.

In order to improve the positive-electrode properties, new systems are being sought to replace, for example, the carbon positive electrode. A variety of efforts are being made here. The carbon materials are being replaced, for example, by oxidic materials or alloys. In Journal of Power Sources 75 (1998), Wolfenstine investigates the suitability of tin oxide/ tin mixtures as positive-electrode material for lithium ion batteries. The irreversible loss of Li due to the formation of $Li_2O$ is said to be minimized by the preferred use of SnO over $SnO_2$. EP 0823742 describes tin mixed oxides doped with various metals. U.S. Pat. No. 5,654,114 also describes the use of tin oxides as positive-electrode material for secondary lithium ion batteries. All the systems investigated have the drawback that Li is converted into $Li_2O$. This means that a large amount of Li is bound, and therefore is not available for the electrochemical processes in the battery.

One feature of the present invention is to provide positive-electrode materials which offer better charging/ discharging behaviour compared with carbon. The better behaviour should be characterized by higher capacities and good cycle stability.

This feature according to the invention can be achieved by the use of modified tin oxides, which are used as positive-electrode material in electrochemical cells.

It has been found that reduction of the tin oxide by means of reducing gases results in an improved positive-electrode system. This system consists of a mixture of tin oxide and tin particles which is finely distributed in the tin oxide grains and the conventional additives (for example PTFE, or PVDF; solvents, e.g. nonpolar solvents; and conductive black). Conductive black is provided in amounts of, generally, about 1–about 5% by weight; preferably about 3% by weight; PTFE or PVDF is provided in amounts of, generally, about 20–about 40% by weight, preferably about 35% by weight; and at least one solvent is provided in amounts of, generally, about 5–about 20% by weight, preferably about 12% by weight.

Surprisingly, it has been found that the modified tin oxide systems have excellent electrochemical properties. The irreversible loss of lithium during the 1st cycle is still observed. However, it is not as pronounced as before the treatment of the tin oxide $SnO_2$.

The prior-art uses of tin oxides for positive-electrode materials have the problem of particle agglomeration. Surprisingly, it has been found that the process according to the invention enables the production of particles of defined diameter. The process according to the invention enables the production of primary particles in the nm range and secondary particles having a diameter of less than 10 μm. These small particles result in an increase in the active surface area.

The process for the preparation of the positive-electrode material is characterized in that a) urea is added to a tin chloride solution,
b) urotropin is added to the solution,
c) the resultant sol is emulsified in petroleum ether,
d) the resultant gel is washed, and the solvent is removed by suction,
e) the gel is dried and heat-treated, and
f) the resultant $SnO_2$ is exposed to a reducing gas stream in an aeratable furnace.

The materials according to the invention are suitable for use in electrochemical cells, preferably in batteries, particularly preferably in secondary lithium ion batteries.

The positive-electrode material according to the invention can be employed in secondary lithium ion batteries with customary electrolytes. Examples of suitable electrolytes are those comprising conductive salts selected from the group consisting of $LiPF_6$, $LiBF_4$, $LiClO_4$, $LiAsF_6$, $LiCF_3SO_3$, $LiN(CF_3SO_2)_2$ and $LiC(CF_3SO_2)_3$, and mixtures thereof. The electrolytes may also comprise organic isocyanates (DE 199 44 603) for reducing the water content. The electrolytes may also comprise organic alkali metal salts (DE 199 10 968) as additive. Suitable are alkali metal borates of the general formula

in which m and p are 0, 1, 2, 3 or 4, where m+p=4, and
$R^1$ and $R^2$ are identical or different,
are optionally bonded directly to one another via a single or double bond,
are each, individually or together, an aromatic or aliphatic carboxylic, dicarboxylic or sulfonic acid radical, or
are each, individually or together, an aromatic ring from the group consisting of phenyl, naphthyl, anthracenyl and phenanthrenyl, which may be unsubstituted or mono- to tetrasubstituted by A or Hal, or
are each, individually or together, a heterocyclic aromatic ring from the group consisting of pyridyl, pyrazyl and bipyridyl, which may be unsubstituted or mono- to trisubstituted by A or Hal, or
are each, individually or together, an aromatic hydroxy acid from the group consisting of aromatic hydroxycarboxylic acids and aromatic hydroxysulfonic acids, which may be unsubstituted or mono- to tetrasubstituted by A or Hal, and
Hal is F, Cl or Br
and
A is alkyl having 1 to 6 carbon atoms, which may be mono- to trihalogenated.

Likewise suitable are alkali metal alkoxides of the general formula

in which R
- is an aromatic or aliphatic carboxylic, dicarboxylic or sulfonic acid radical, or
- is an aromatic ring from the group consisting of phenyl, naphthyl, anthracenyl and phenanthrenyl, which may be unsubstituted or mono- to tetrasubstituted by A or Hal, or
- is a heterocyclic aromatic ring from the group consisting of pyridyl, pyrazyl and bipyridyl, which may be unsubstituted or mono- to trisubstituted by A or Hal, or
- is an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may be mono- to trihalogenated.

Lithium complex salts of the formula

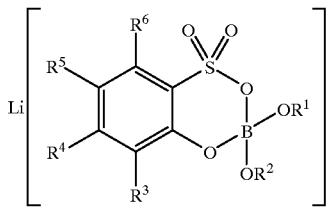

where $R^1$ and $R^2$ are identical or different, are optionally bonded directly to one another via a single or double bond, and are each, individually or together, an aromatic ring from the group consisting of phenyl, naphthyl, anthracenyl and phenanthrenyl, which may be unsubstituted or mono- to hexasubstituted by alkyl ($C_1$ to $C_6$), alkoxy groups ($C_1$ to $C_6$) or halogen (F, Cl or Br), or are each, individually or together, an aromatic heterocyclic ring from the group consisting of pyridyl, pyrazyl and pyrimidyl, which may be unsubstituted or mono- to tetrasubstituted by alkyl ($C_1$ to $C_6$), alkoxy groups ($C_1$ to $C_6$) or halogen (F, Cl or Br), or are each, individually or together, an aromatic ring from the group consisting of hydroxybenzocarboxyl, hydroxynaphthalenecarboxyl, hydroxybenzosulfonyl and hydroxynaphthalenesulfonyl, which may be unsubstituted or mono- to tetrasubstituted by alkyl, ($C_1$ to $C_6$), alkoxy groups ($C_1$ to $C_6$) or halogen (F, Cl or Br), $R^3$–$R^6$ may each, individually or in pairs and optionally bonded directly to one another via a single or double bond, have the following meanings:
1. alkyl ($C_1$ to $C_6$), alkoxy ($C_1$ to $C_6$) or halogen (F, Cl or Br)
2. an aromatic ring from the groups consisting of phenyl, naphthyl, anthracenyl and phenanthrenyl, which may be unsubstituted or mono- to hexasubstituted by alkyl ($C_1$ to $C_6$), alkoxy groups ($C_1$ to $C_6$) or halogen (F, Cl or Br), pyridyl, pyrazyl and pyrimidyl, which may be unsubstituted or mono- to tetrasubstituted by alkyl ($C_1$ to $C_6$), alkoxy groups ($C_1$ to $C_6$) or halogen (F, Cl or Br), which are prepared by the following process (DE 199 32 317):
a) chlorosulfonic acid is added to 3-, 4-, 5- or 6-substituted phenol in a suitable solvent,
b) the intermediate from a) is reacted with chlorotrimethylsilane, and the reaction mixture is filtered and subjected to fractional distillation,
c) the intermediate from b) is reacted with lithium tetramethoxyborate(1-) in a suitable solvent, and the end product is isolated therefrom, may also be present in the electrolyte.

The electrolytes may likewise comprise compounds of the following formula (DE 199 41 566):

where

Kt=N, P, As, Sb, S or Se

A=N, P, P(O), O, S, S(O), $SO_2$, As, As(O), Sb or Sb(O)

$R^1$, $R^2$ and $R^3$ are identical or different and are H, halogen, substituted and/or unsubstituted alkyl $C_nH_{2n+1}$, substituted and/or unsubstituted alkenyl having 1–18 carbon atoms and one or more double bonds, substituted and/or unsubstituted alkynyl having 1–18 carbon atoms and one or more triple bonds, substituted and/or unsubstituted cycloalkyl $C_mH_{2m-1}$, mono- or polysubstituted and/or unsubstituted phenyl, or substituted and/or unsubstituted heteroaryl, A can be included in $R^1$, $R^2$ and/or $R^3$ in various positions, Kt can be included in a cyclic or heterocyclic ring, the groups bonded to Kt may be identical or different, where n=1–18 m=3–7 k=0 or 1–6 l=1 or 2 in the case where x=1 and 1 in the case where x=0 x=0 or 1 y=1–4.

The process for the preparation of these compounds is characterized in that an alkali metal salt of the general formula

where $D^+$ is selected from the group consisting of the alkali metals, is reacted, in a polar organic solvent, with a salt of the general formula

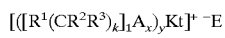

where

Kt, A, $R^1$, $R^2$, $R^3$, k, l, x and y are as defined above, and $^-E$ is $F^-$, $Cl^-$, $Br^-$, $I^-$, $BF_4^-$, $ClO_4^-$, $AsF_6^-$, $SbF_6^-$ or $PF_6^-$.

However, use can also be made of electrolytes comprising compounds of the general formula (DE 199 53 638)

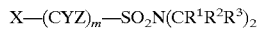

where

X is H, F, Cl, $C_nF_{2n+1}$, $C_nF_{2n-1}$ or $(SO_2)_kN(CR^1R^2R^3)_2$.

Y is H, F or Cl

Z is H, F or Cl $R^1$, $R^2$ and $R^3$ are H and/or alkyl, fluoroalkyl or cycloalkyl m is 0–9 and, if X=H, m≠0 n is 1–9 k is 0 if m=0 and k=1 if m=1–9, prepared by reacting partially or perfluorinated alkylsulfonyl fluorides with dimethylamine in organic solvents, and complex salts of the general formula (DE 199 51 804)

in which:

x and y are 1, 2, 3, 4, 5 or 6

$M^{x+}$ is a metal ion

E is a Lewis acid selected from the group consisting of $BR^1R^2R^3$, $AlR^1R^2R^3$, $PR^1R^2R^3R^4R^5$, $AsR^1R^2R^3R^4R^5$ and $VR^1R^2R^3R^4R^5$, $R^1$ to $R^5$ are identical or different, are optionally bonded directly to one another via a single or double bond, and each, individually or together, are a halogen (F, Cl or Br), an alkyl or alkoxy radical ($C_1$ to $C_8$), which may be partially or fully substituted by F, Cl or Br, an aromatic ring, optionally bonded via oxygen, from the group consisting of phenyl, naphthyl, anthracenyl and phenanthrenyl, which may be unsubstituted or mono- to hexasubstituted by alkyl ($C_1$ to $C_8$) or F, Cl or Br, an aromatic heterocyclic ring, optionally bonded via oxygen, from the group consisting of pyridyl, pyrazyl and pyrimidyl, which may be unsubstituted or mono- to tetrasubstituted by alkyl ($C_1$ to $C_8$) or F, Cl or Br, and Z is $OR^6$, $NR^6R^7$, $CR^6R^7R^8$, $OSO_2R^6$, $N(SO_2R^6)(SO_2R^7)$ $C(SO_2R^6)(SO_2R^7)$ $(SO_2R^8)$ or $OCOR^6$, where $R^6$ to $R^8$ are identical or different, are optionally bonded directly to one another via a single or double bond and are each, individually or together, hydrogen or as defined for $R^1$ to $R^5$, prepared by reacting a corresponding boron or phosphorus Lewis acid/solvent adduct with a lithium or tetraalkylammonium imide, methanide or triflate.

Borate salts (DE 199 59 722) of the general formula

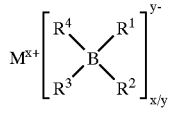

in which:

M is a metal ion or tetraalkylammonium ion, x and y are 1, 2, 3, 4, 5 or 6, $R^1$ to $R^4$ are identical or different and are alkoxy or carboxyl radicals ($C_1$–$C_8$), which are optionally bonded directly to one another via a single or double bond, may also be present. These borate salts are prepared by reacting lithium tetraalkoxyborate or a 1:1 mixture of lithium alkoxide and a borate with a suitable hydroxyl or carboxyl compound in a ratio of 2:1 or 4:1 in an aprotic solvent.

The positive-electrode materials according to the invention can likewise be employed in systems with polymer-coated lithium mixed oxide particles for negative-electrode materials (DE 19946066). The process for the production of lithium mixed oxide particles coated with one or more polymers is characterized in that the particles are suspended in a solvent, and the coated particles are then filtered off, dried and, if desired, calcined. The positive-electrode materials according to the invention can also be employed in systems with negative electrodes consisting of lithium mixed oxide particles coated with one or more metal oxides (DE 19922522). The process for the production of lithium mixed oxide particles coated with one or more metal oxides is characterized in that the particles are suspended in an organic solvent, a solution of a hydrolysable metal compound and a hydrolysis solution are added to the suspension, and the coated particles are then filtered off, dried and, if desired, calcined.

A general example of the invention is explained in greater detail below.

The starting compounds employed are about 1–about 2 molar, preferably about 2 molar, tin tetrachloride solutions. The solution is introduced into water with cooling and vigorous stirring. The white precipitate formed in the case of the Sn system is dissolved by warming. After the mixture has been cooled to room temperature, the amount of urea corresponding to the system is added and dissolved completely. The addition of the urea and the dissolution behaviour are system-dependent.

Through addition of water, the dissolved concentration of the solution is set (see information above). The solution is cooled to temperatures from 0–about 10° C., preferably about 5–about 7° C. An about 3.5 molar hexamethylenetetramine solution is added in the preferred ratio about 1:1. The ratio also applies to the tin system. It is also possible to use about a 10% sub- or superstoichiometric amount of hexamethylenetetramine. The mixture is stirred until the sol is clear.

Benzine (petroleum ether) is mixed with about 0.5–about 1.5%, preferably about 0.7%, of commercially available emulsifiers, preferably with SPAN 80 emulsifier, manufactured by Sigma Aldrich Chemie GmbH of Eschenstr. 5, 82024 Taufkirchen (Germany). The solution is warmed to temperatures of about 30° C.–about 70° C., preferably to about 50° C. The solution described above is added with constant stirring. An ammonia solution is added to the forming gel after about 3–about 20 minutes, preferably after about 10 minutes, and the pH is stabilized so that no peptization of the gel occurs. After the organic phase has been decanted, the gel is washed with a suitable organic solvent, preferably with petroleum ether or benzine having a boiling point of about 63–140° C. In order to remove the emulsifier and organic impurities, detergents, preferably TRITON detergent, manufactured by Sigma Aldrich Chemie GmbH, Eschenstr. 5, 82024 Taufkirchen (Germany); are subsequently added to the solution. The solution is filtered with suction, and the gel is washed with water and acetone.

The gel is dried and, if desired, subjected to heat treatment. If an SnO system is desired, drying to a maximum of about 230° C., preferably at about 75° C.–about 110° C., is sufficient. If an $SnO_2$ system is desired, the drying is followed by heat treatment. The heat treatment is carried out at temperatures of about 230° C.–about 500° C., preferably about 55° C.–about 350° C., and optimally at about 350° C. The heat treatment is carried out for about 10 minutes– about 5 hours, preferably about 90 minutes–about 3 hours, and optimally for about 2 hours.

The heat-treated material is aerated with a reducing gas in an aeratable furnace, for example a muffle furnace, a tubular furnace or a chamber furnace. The reduction gas mixture can be, for example, hydrogen and argon or nitrogen. The gas stream is set to about 5–about 15 litres/hour, preferably to about 10 litres/hour. The reduction gas mixture is fed to the system for a period of about 0.5–about 5 hours, preferably about 2.5–about 3.5 hours.

The temperature for the reduction process can be varied from about 230° C.–about 600° C., preferably about 300–about 500° C., and optimally at about 500° C.

Depending on the duration of exposure to the temperature and the amount of reducing gas, different concentrations of Sn in the $SnO_2$ matrix are formed. For the electrochemical properties of the electrochemical cell, a concentration of Sn in the $SnO_2$ matrix of about 20–about 70% by weight, preferably about 30–about 40%, and optimally about 38%, has become desirable for the positive-electrode material. In addition, different concentrations of Sn can be formed in a SnO matrix. Generally, a concentration of Sn in SnO matrix is about 10–about 40% by weight, preferably about 20–about 35% by weight, and optionally about 30% by weight.

The measured capacity of the positive electrode consisting of an $SnO_2$/Sn system is still remarkably approximately 600 mAh/g after the 3rd cycle.

The initial capacity is significantly higher than in the case of the carbon positive electrode. With progressing cycling, the capacity of the carbon is achieved.

The reversibility, i.e. the effective charging and discharging of the cells, is about 90%.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited herein and corresponding German Application No. 10025762.3, filed May 25, 2000, is hereby incorporated by reference.

EXAMPLES

Example 1

Sol-gel Synthesis
Solution 1

250 ml of water are introduced into a four-necked flask with stirrer. 235 ml of $SnCl_4$ are added dropwise over the course of 90 minutes with vigorous stirring (350 rpm) and ice cooling. A white precipitate forms which begins to dissolve by warming of the solution. The warming is carried out for 60 minutes and is terminated after the precipitate has dissolved completely and the boiling point (122° C.) has been reached. After the mixture has been cooled to room temperature, 600 g of urea are introduced and dissolved completely. The corresponding amount of doping compound is furthermore added and dissolved. The endothermic dissolution process results in a clear, high-viscosity solution, which is made up to one litre of solution with water.

Example 2

Solution 2

In order to prepare solution 2, 490 g of urotropin (hexamethylenetetramine=HMT) are dissolved in 600 ml of water in a beaker on a magnetic stirrer and, when the slightly exothermic dissolution is complete, is made up to one litre of slightly greenish, cloudy solution.

Example 3

Emulsion Formation 400 ml of benzine are added to 2.0 g of Span 80 (=0.74%) in a 1 litre beaker and mixed at 350 rpm. The temperature is set to 50° C. by means of a water bath. The freshly prepared mixture described in Example 2 is added and emulsified at 400 rpm. After about 4 minutes, the gel forms.

After 10 minutes, 10 ml of 1% ammonia are added, and the mixture is emulsified at 400 rpm for a further 6 minutes.

Example 4

Phase Separation and Extraction

The organic benzine phase is decanted, washed with 2×35 ml of petroleum ether and separated.

In order to remove the emulsifier, the gel is mixed with 30 ml of Triton solution (concentration of the Triton solution can be matched to the system) and slurried for 6 minutes in the beaker. The mixture is filtered off via a suction filter and washed with 200 ml of water. The residue is then covered with acetone and filtered with suction for precisely 15 minutes.

Example 5

Drying and Heat Treatment

The product is dried for one day in air and for one day in a drying cabinet at 60° C.

Appearance before the heat treatment: whitish transparent uniform beads

Heat treatment: program:
20° C.→180 min→350° C./120 min→20° C. Appearance: virtually unchanged Example 6

Reduction

The reduction of the SnOx particles produced is carried out in defined reducing media and results in the generation of Sn metal particles in the $SnO_2$ matrix.

The $SnO_2$ described under examples 1–5 is heated here in a reducing gas stream. The reduction mixture is composed of hydrogen and argon. The hydrogen proportion is 7.5%.

The reduction process is carried out for 3 hours at a temperature of 500° C. A gas stream of 10 litres/hour is set.

For the electrochemical properties in the electrochemical cell, a preferred concentration of Sn in the $SnO_2$ matrix of 38% has become evident for the positive-electrode material.

The measured capacity of the positive electrode consisting of an $SnO_2$/Sn system is approximately 600 mAh/g after the 3rd cycle.

The reversibility, i.e. the effective charging and discharging of the cells, is about 90%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A positive-electrode material comprising a mixture of a tin oxide and tin particles wherein the positive-electrode material comprises the tin particles in a SnO matrix.

2. An electrochemical cell comprising a negative electrode, a separator, an electrolyte, and a positive-electrode material according to claim 1.

3. A positive-electrode material according to claim 1, wherein the tin particles are made by reducing a tin oxide.

4. An electrochemical cell comprising a positive-electrode material according to claim 1 for improving the cycle stability and increasing the capacity.

5. An electrochemical cell, a battery or a secondary lithium battery comprising a positive-electrode material according to claim 1.

6. A positive electrode material according to claim 1, wherein the concentration of tin particles relative to SnO is about 10–about 40% by weight.

7. A positive electrode material according to claim 1, wherein the concentration of tin particles relative to SnO is about 20–about 35% by weight.

8. A positive electrode material comprising a mixture of a tin oxide and tin particles, wherein the positive-electrode material comprises the tin particles in a $SnO_2$ matrix.

9. A process for the preparation of the positive-electrode material according to claim 8, comprising:
   a) adding urea to a tin chloride solution,
   b) adding urotropin to the solution,
   c) emulsifying the resultant sol in petroleum ether,
   d) washing the resultant gel, and removing the solvent by suction,
   e) drying and heat-treating the gel, and
   f) exposing the resultant $SnO_2$ to a reducing gas stream in an aeratable furnace.

10. A process for the preparation of the positive-electrode material according to claim 8, comprising exposing $SnO_2$ to a reducing gas stream in an aeratable furnace.

11. A positive electrode material comprising a concentration of Sn particles in an $SnO_2$ matrix of about 20–about 70% by weight, wherein the Sn particles are made by reducing a portion of the $SnO_2$ in the matrix.

12. A positive-electrode material according to claim 11, wherein the concentration of Sn particles relative to $SnO_2$ is about 30–about 40% by weight.

13. A positive-electrode material according to claim 11, wherein the concentration of Sn particles relative to $SnO_2$ is about 38% by weight.

14. A positive electrode material comprising a concentration of Sn particles in an SnO matrix of about 10–about 40% by weight, wherein the Sn particles are made by reducing a portion of the SnO in the matrix.

* * * * *